United States Patent [19]
Eisenberg

[11] 3,748,384
[45] July 24, 1973

[54] CLOSED CIRCUIT TELEVISION PROMPTING DEVICE

[75] Inventor: Alvin S. Eisenberg, Little Neck, N.Y.
[73] Assignee: Q-TV, Inc., New York, N.Y.

[22] Filed: Jan. 17, 1972
[21] Appl. No.: 218,138

[52] U.S. Cl. .............. 178/7.2, 178/DIG. 30, 178/7.9
[51] Int. Cl. .............. H04n 5/24
[58] Field of Search .............. 178/DIG. 30, 7.9; 40/86 R, 86 A, 280; 352/4

[56] References Cited

UNITED STATES PATENTS

| | | | |
|---|---|---|---|
| 3,461,228 | 8/1969 | Bookman | 178/DIG. 30 |
| 2,498,476 | 2/1950 | Alfonso | 40/86 R |
| 3,303,580 | 2/1967 | Stinar | 40/86 R |
| 2,696,753 | 12/1954 | Segal et al. | 352/4 |

*Primary Examiner*—Robert L. Griffin
*Assistant Examiner*—Joseph A. Orsino, Jr.
*Attorney*—Albert F. Kronman

[57] ABSTRACT

Spaced script display panels are carried within a housing which also supports two television cameras. Each panel is disposed within the field of one of the cameras. Drive means associated with each panel permits the operator to move a script across each panel at a desired speed. One or both of the cameras may be activated to produce an image of the script in the field of the camera upon a television display screen.

5 Claims, 5 Drawing Figures

CLOSED CIRCUIT TELEVISION PROMPTING DEVICE

BACKGROUND OF THE INVENTION

It is well-known in the performing arts such as television or public speaking to prepare a script upon an elongated strip of paper and then unroll the script mechanically so that the speaker can read it as he is performing. Such devices may use mirrors or other structures to bring the script into such a position that it can be read without the knowledge of the audience.

In certain types of performances such as television news broadcasts, it is often desirable to insert news flashes or last minute information into the previously prepared script. Often supplemental instructions must be given the person reading the script in order to improve his performance.

Accordingly, it is an object of the present invention to provide a prompting device in which information may be displayed upon a television display screen from either one of two display panels.

Another object of the present invention is to provide a prompting device which will permit supplemental or corrective information to be displayed upon a television screen.

A further object of the present invention is to provide great flexibility of controls such as speed of travel of the display, switching from one script to another and use of sheets as well as strip material to carry the prompting information.

A feature of the present invention is its ability to switch from one display screen to another, thereby permitting the performer to move about.

For a better understanding of the present invention, together with other features and details thereof, reference is made to the following description taken in connection with the accompanying drawings.

DESCRIPTION OF THE PREFERRED EMBODIMENT

Figure 1:
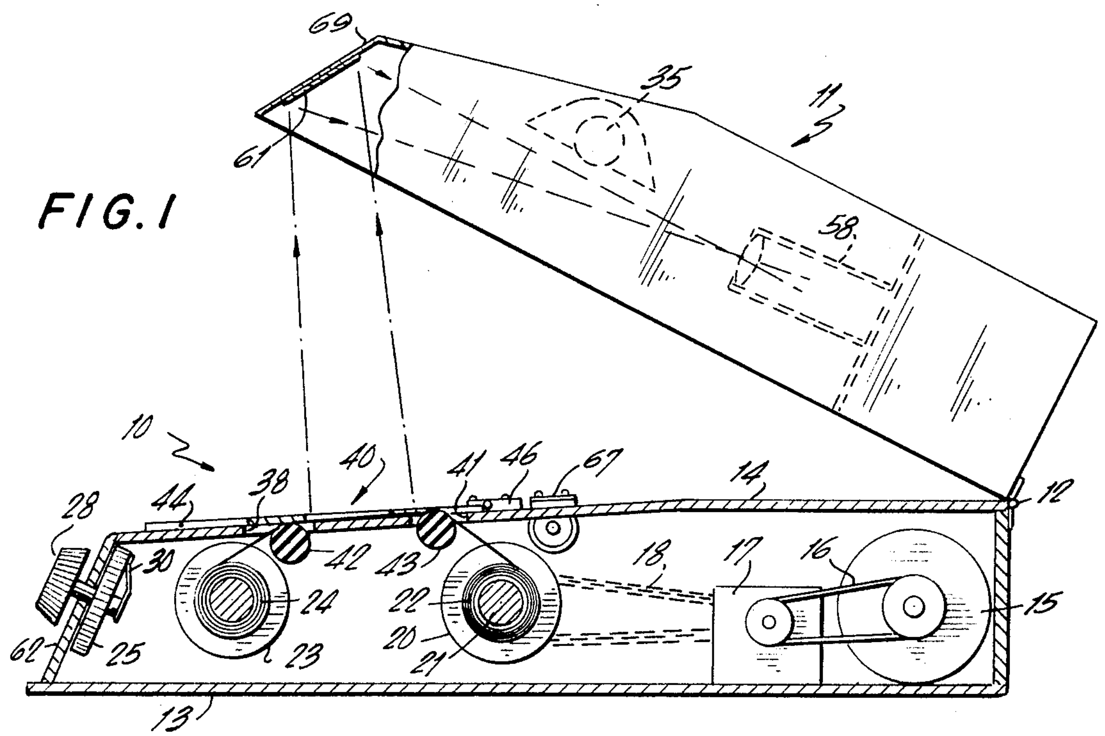
FIG. 1 is a side view of the prompter showing the script feed table in section. The section is taken along line 1—1 of FIG. 2.
Figure 2:
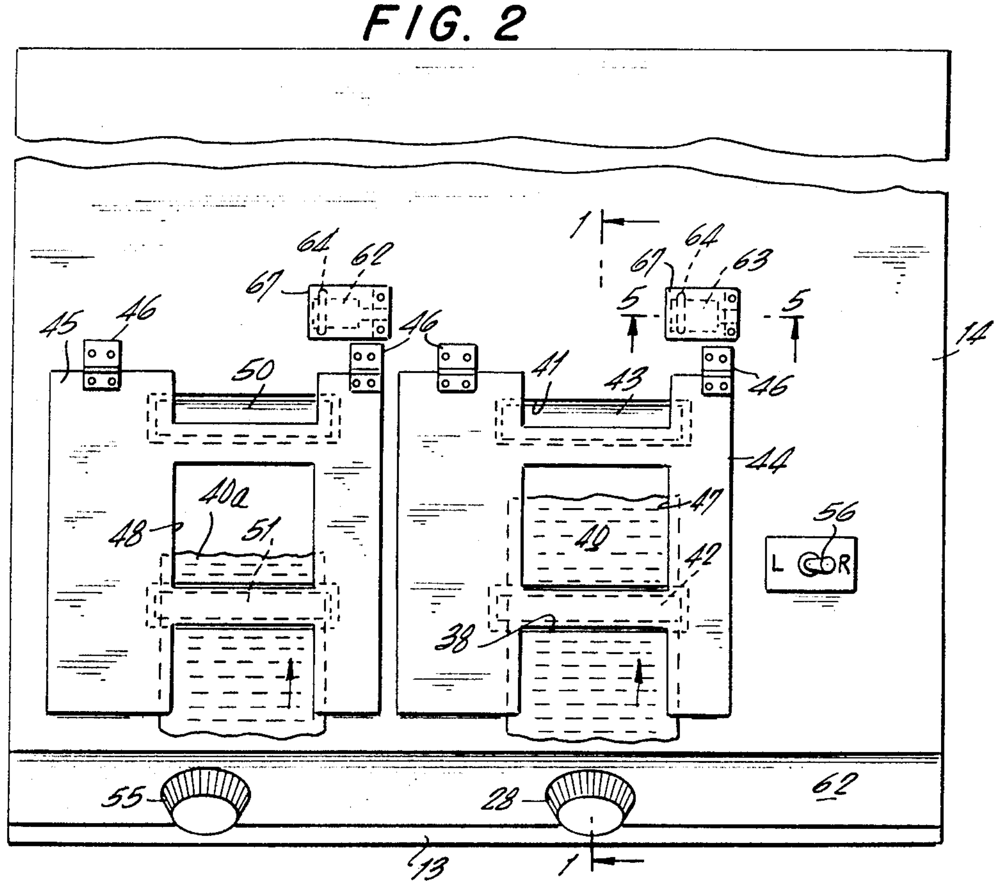
FIG. 2 is a plan view of the feed table portion of the prompter showing the two display panels.
Figure 3:
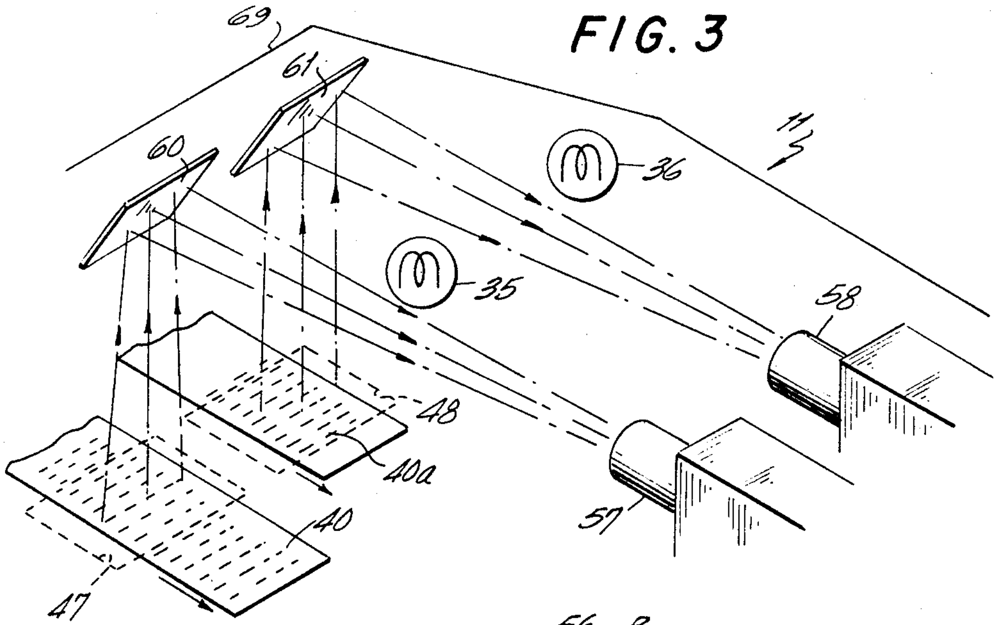
FIG. 3 is a schematic view of the upper or cover portion of the prompter showing the television cameras, the lamps for illuminating the feed table and display panels, and two mirrors.

Referring now to FIGS. 1, 2, and 3, the prompting device is contained in a housing having a lower or base portion 10, and an upper cover portion 11, connected by a hinge 12. When not in use, the upper portion 11 may be lowered onto the base portion 10 to protect its components. The base portion 10 is closed by a bottom member 13 and an upper panel 14 made of steel, aluminum or other rigid material. An electric motor 15 is supported on the bottom 13 and is coupled by means of a belt 16 to a gear reduction unit 17. The gear reduction unit 17 is connected by means of a chain drive 18 to a script take-up spool 20. The spool 20 has a cylindrical core 21, long enough to accomodate the width of a roll of paper 22 containing the script or written directions to be viewed by the performer. A supply spool 23 similar to spool 20 is mounted parallel with spool 20 to initially receive the roll of script 24.

In order to control the speed of the motor 15 and the travel of paper 22, a voltage divider 25 is connected in the electrical circuit and coupled to a rectifier 26 (FIG. 4) and an A.C. transformer 27. Variations of the motor speed are controlled by a manually adjustable knob 28 (FIGS. 1 and 2) connected to a variable contact arm 30. A.C. power for the motors is applied to terminals 31, 32 and the primary winding 33 of transformer 27 in series with a power switch 34. Terminals 31, 32 are also connected to the high intensity illuminating lamps 35, 36 in series with a switch 37. It should be noted that, since there are two display panels, there are also two motors, two gear reduction units, two sets of paper spools, and two voltage dividers. The duplicate equipment is not in evidence in FIG. 1 because the second set lies directly behind the units shown.

The top panel 14 of the base 10 is formed with two spaced slots 38, 41 for each display panel. As shown in FIG. 1 slot 38 is for the passage of paper from roll 24 to the display position 40 on top of the top panel 14. A similar slot 41 is for the passage of the same paper as it leaves the top panel and is wound on the take-up spool 20. Friction rollers 42 and 43 are also positioned in within the slots 38, 41 in the top panel. The rollers 42 and 43 are able to guide and propel short lengths of paper inserted into the panel area by hand from a position on top of the panel and also serve to drive the rolls of paper. Friction rollers 42, 43 are both power driven by belts or chains coupled to one of the motors 15.

Figure 4:
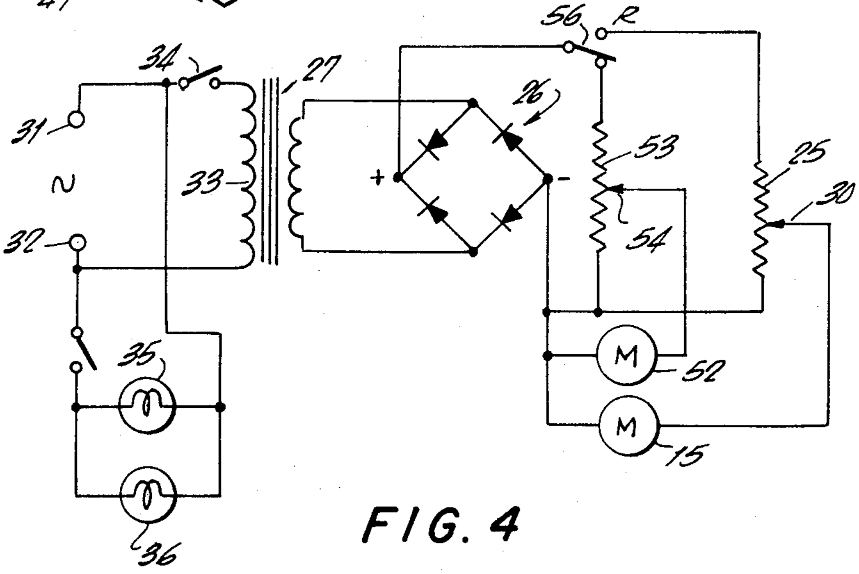
FIG. 4 is a schematic diagram of connections of the electrical system which powers the motors.
Figure 5:
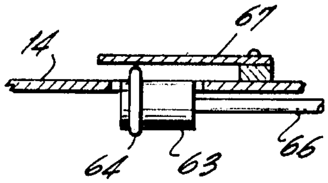
FIG. 5 is a view partly in cross section of one of the friction drive rollers and is taken along line 5—5 of FIG. 2.

Two apertured masks 44, 45, are secured to the top panel 14 by hinges 46 and act to urge the script paper against the surface of the friction rollers. The masks also frame the script viewing space which is within a square window 47, 48, in the masks. The second display panel is the same as that described above having a second viewing space within window 48 and friction rollers 50 and 51. The second motor 52 (see FIG. 4) is controlled by a voltage divider 53 having an adjustable contact point 54. The contact point 54 is moved along the divider 53 by knob 55 on the front panel 68. A single pole, double throw switch 56 is mounted on the top panel and, as shown in FIG. 4, switches the positive terminal of rectifier 26 from one voltage divider to another, thereby turning one motor on at the same time the other motor is turned off. Other switch arms and contacts can be coupled to the switch lever to switch television cameras 57, 58.

The upper or cover portion 11 of the prompting device (see FIG. 3) contains two high intensity lamps 35, 36, two television cameras 57 and 58, and two front surface mirrors 60 and 61. The cameras 57, 58 are well known in the closed circuit television art and need not be described in detail here. The mirrors are secured to the inside surface of the front wall 69 of the cover portion 11 and are adjusted to reflect the light from the viewing area 40 to the entrance lenses of the cameras 57, 58.

When the device is put into operation, switches 34 and 37 are closed and switch 56 is moved to energize the desired motor. If the right hand motor is connected to the power line, a spool of script paper is coupled to its drive under the viewing area 40 and the free end of the paper attached to the core 21 of the take-up spool 20. The mask 44 is lowered into place and the prompter is ready for action. As the announcer reads the script produced on a television display tube adjoining the studio main camera, an operator adjusts the speed of the paper through the viewing area so that the announcer always has some unread material in view. All of the script information in the viewing area window is reflected by one of the mirrors 60 or 61, picked up by one of the cameras 57 and 58 and then sent over wire line to a receiving circuit and a television display tube in view of the performer.

The use of strips of paper on spools 20 and 23 are suitable for a long speech. If short announcements are to be made, a short strip or sheet of paper, bearing the message, may be moved into the viewing field on top of the spool strip or the strip may be moved under the opposite mask 45. There may be times when no paper is put on the spools and all the script information is supplied by paper sheets delivered to the top surface of panel 14. Friction rollers 42, 43 under the right hand mask 44 are kept running as are rollers 50 and 51 under the left hand mask 45. The paper slips are moved under the masks until the first rollers 42 or 51 engage them and move them into the viewing area. If the rear rollers 43, 50 were the only means of moving the short strips of paper away from the mask, the papers would eventually pile up under the mask and lift the mask away from the top panel. In order to move the short pieces of paper away from the masks 44 and 45, two rollers 62, 63, are mounted under the top panel 14 with a segment of a friction O-ring 64 projecting above the panel through an aperture 65. Roller 63 is turned by a shaft 66 coupled to one of the motors 15 or 52. A cover plate 67 covers the roller 63 and keeps the paper in contact with the friction ring 64.

The prompting device as described above has considerable flexibility since there are two display areas, means for using separate papers, or a long roll of directions, and a variable speed control for each motor. While the device is designed for persons appearing on television programs it will be obvious that it can be used for public speakers addressing an audience or, in some cases, an actor in a stage presentation.

By using a plurality of display screens located about the studio, the performer can look from side to side or even move about without losing his prompting information.

Having thus fully described the invention, what I claim as new and desired to be secured by Letters Patent of the United States, is:

1. A closed circuit television prompting device for transmitting prompting material shown on a viewing area to a television display screen comprising: a housing, said housing having a base and a cover section hingedly connected together; a display panel on the housing base to receive prompting material; two hinged masks on the display panel having area defining windows therein to provide two viewing areas and for urging prompting material against the display panel; power means in the base for advancing prompting material beneath either of the hinged masks, said power means including an electric motor, two friction rollers driven by said motor, and a motor speed control arranged for manual adjustment; and a television camera system for each viewing area carried within the cover section of the housing and directed at the prompting material therein to transmit an image of the data on the prompting material to a television display screen.

2. A device as claimed in claim 1 wherein each of said camera systems includes a mirror and a lens secured to the inner surface of the hinged cover.

3. A device as claimed in claim 1 wherein said power means also includes a voltage divider connected across a source of power, an adjustable sliding contact means on the voltage divider, and a motor connected between one end of the voltage divider and the adjustable contact.

4. A device as claimed in claim 3 wherein a switch is mounted on the panel and connected to the voltage dividers for switching the motor controlling means from one motor and television camera to another.

5. A device as claimed in claim 1 wherein a pair of friction rollers turned by the motor are positioned under the mask for moving prompting sheets through the viewing area at a desired speed.

* * * * *